(No Model.)
J. ARMSTRONG.
TOOL HOLDER.
No. 535,440.        Patented Mar. 12, 1895.
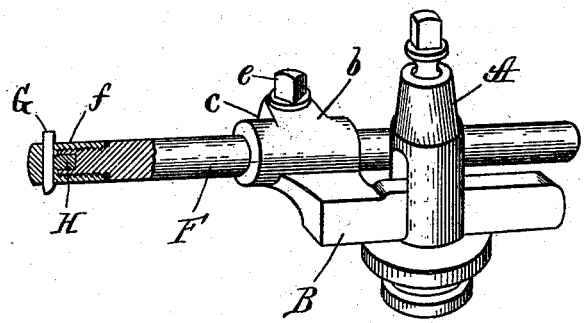
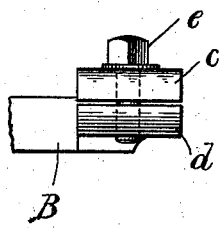
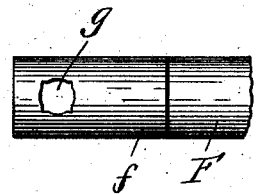
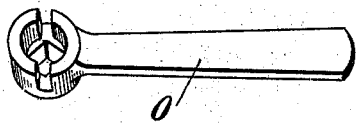
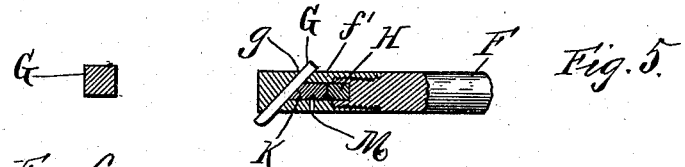
Witnesses:
Jno. A. Christianson.
Victor E. Bostrom.
Inventor:
James Armstrong
By Louis K. Gillson
His Attorney.

United States Patent Office.

JAMES ARMSTRONG, OF CHICAGO, ILLINOIS, ASSIGNOR TO ARMSTRONG BROTHERS, OF SAME PLACE.

TOOL-HOLDER.

SPECIFICATION forming part of Letters Patent No. 535,440, dated March 12, 1895.

Application filed April 30, 1894. Serial No. 509,524. (No model.)

*To all whom it may concern:*

Be it known that I, JAMES ARMSTRONG, a citizen of the United States, residing at Chicago, in the county of Cook and State of Illinois, have invented certain new and useful Improvements in Tool-Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to holders for metal working tools, particularly for tools used in boring. Its object is to provide means for securely holding small cutters of bar steel and presenting them to the work in any desired position.

The invention comprises a stock adapted to be set into the tool post of a lathe and having an offset hub apertured for the reception of the tool-holding bar, an improved method of securing the cutter in this bar, and other minor features hereinafter fully described.

In the accompanying drawings, Figure 1 is a perspective of the tool holder in position for use, a portion of it being shown in section. Fig. 2 is a detail showing the means for locking the bar within the hub. Fig. 3 is a plan view of a portion of the bar. Fig. 4 shows the wrench used in connection with the tool. Fig. 5 is a longitudinal section of a portion of the bar as adapted to hold the tool in an oblique position; and Fig. 6 is a cross-section of the tool used with the holder.

An ordinary tool-post of a lathe is shown at A. The stock of the tool holder has a straight body portion B, adapted to fit within the socket of the tool-post, and a lateral off-set, $b$, forming a hub or clamp apertured to receive a round bar, F, which carries the tool or cutter, G. The hub, $b$, is split along its outer side so that it is in the form of a pair of jaws. These jaws are provided with lips, $c$, $d$, apertured for the reception of a binding screw $e$, by means of which they may be drawn firmly together. The stock is of steel. Normally its lips $c$, $d$, are slightly separated, as shown in Fig. 2. When in this position the bar F fits loosely within the aperture of the stock, but when the jaws are drawn together they grasp it firmly and prevent the possibility of displacement under any strain that may be brought upon it.

The bar aperture of the hub, $b$, is parallel with the body, B, of the stock, and the hub is off-set sufficiently so that the bar, F, clears the tool-post A. A cap piece, $f$, internally screw-threaded, is fitted upon one end of the bar, F, the bar being screw-threaded and preferably reduced in size at that end for its reception so that the diameter of the cap and of the bar may be the same.

The cap, $f$, is transversely socketed for the reception of the tool, G, as shown at $g$, and the screw-threaded recess of the cap extends to this socket. A small block of hardened steel, H, is fixed in the screw-threaded end of the bar F, so as to impinge against the tool, G, when it is set in the socket, $g$, and the cap, $f$, turned up on to the end of the bar. By this means the tool is forced against the opposite side of the socket, $g$, and thereby securely locked in its place. It is sometimes desirable to set the tool, G, at an oblique angle to the bar, F. For this purpose a cap, $f'$ is provided, having its transverse socket, $g$, at the desired angle. This form of cap is longer than the cap, $f$. Its recess is screw-threaded through only a portion of its length, and may be of reduced diameter beyond the threaded portion. Within this recess is placed a movable block, K, having one of its faces oblique to bear against the tool, G, and its opposite face adapted to bear against the block, H. As the cap is turned up on the bar, F, the block, K, is forced against the tool, G, and secures it in place. In order that the block, K, may be prevented from falling out of the cap when the latter is removed from the bar, a small recess is formed in its side and a pin, M, is set in the wall of the cap, its point entering the recess. The recess is somewhat larger than the pin so that the block has sufficient play to perform its intended function.

The caps $f$, $f'$, are interchangeable upon the bar, F, so that in changing from one kind of work to another, it is only necessary to exchange the caps. I use the form of socket, $g$, which is covered by Letters Patent No. 492,381, issued to George Armstrong February 28, 1893, in which the seat for the tool is longitudinally grooved so as to form ledges or shoulders for the tool to rest against, thereby insuring a long bearing or contact even though the surface of the tool may not be perfectly flat. The bar, F, being round, may be turned so as to present the edge of the tool to the work at any desired angle.

I am aware that tool holders have been used in which a stock for attachment to the tool-post is used having a transverse aperture for the tool-carrying bar. In such construction it is necessary to make the stock very heavy to get the requisite strength. In the construction shown in this application the strain is communicated longitudinally to the stock, thereby making its greatest strength available.

The wrench O is not claimed as a part of the invention, but is shown for the purpose of making clear the method of securing the parts together. The head of the wrench is transversely apertured; one end of the aperture being square to engage the head of the binding screw, $e$, and the other end being round to fit upon the end of the cap $f$, or $f'$. A slot across the head intersecting the round end of the aperture engages the tool, G, and affords means for turning the cap.

I claim as my invention—

1. In a tool holder the combination with the stock, B, the laterally offset split hub, $b$, the binding screw, $e$, and the bar, F, having its end screw-threaded, of the transversely socketed cap $f'$ having its recess extending to its transverse socket and screw-threaded to engage the end of the bar, F, a block, K, carried loosely within the cap recess, and a wear block set in the end of the bar, substantially as and for the purpose described.

2. In a tool holder, the combination with the stock B, the laterally offset split hub $b$, the binding screw $e$, and the bar F, having its end screw-threaded, of the transversely socketed cap $f'$, having its recess extending to its transverse socket and screw-threaded to engage the end of the bar F, and a block K, carried loosely within the cap recess, substantially as described and for the purpose specified.

In testimony whereof I affix my signature in presence of two witnesses.

JAMES ARMSTRONG.

Witnesses:
 HUGH J. ARMSTRONG,
 G. M. MICHAUD.